March 22, 1960 W. H. LINDSEY 2,929,201
TURBO JET ENGINES AS REGARDS 'REHEAT'
Filed May 13, 1955 2 Sheets-Sheet 1
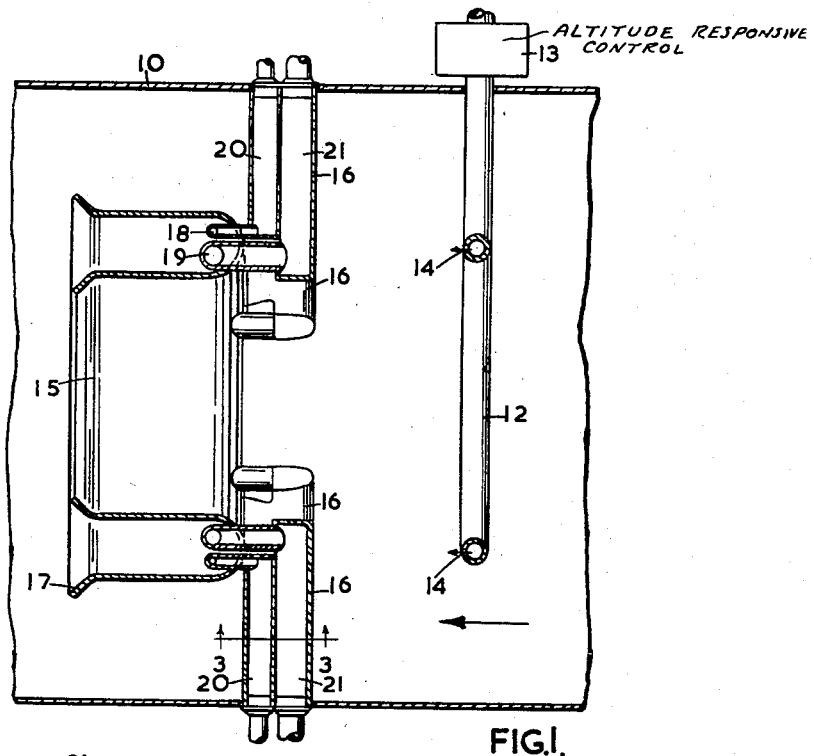
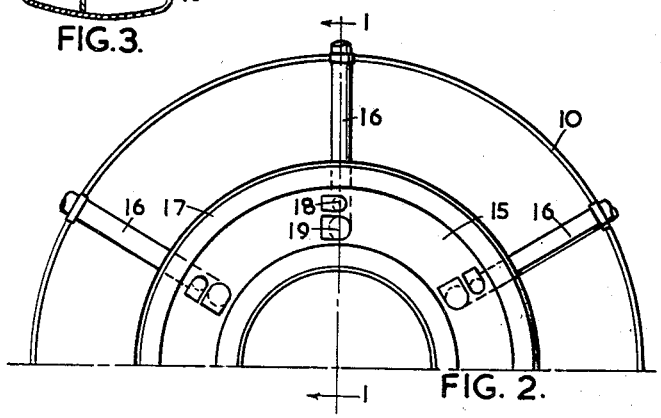
INVENTOR
W. H. LINDSEY

United States Patent Office 2,929,201
Patented Mar. 22, 1960

2,929,201

TURBO JET ENGINES AS REGARDS "REHEAT"

William Henry Lindsey, Coventry, England, assignor to Armstrong Siddeley Motors Limited, Coventry, England Application May 13, 1955, Serial No. 508,025

Claims priority, application Great Britain May 20, 1954

4 Claims. (Cl. 60—35.6)

This invention relates to a turbo-jet engine of the kind including, in the jet pipe, a "reheat" device for the combustion of additional fuel for added thrust.

The advantage of reheat as a method of increasing the performance of a turbo-jet in a modern fighter, for example, is well-known, but at high altitudes, for example at altitudes over 50,000 feet, it is difficult to apply reheat satisfactorily.

It is believed that reheat can be made to work at such altitudes provided that sufficiently low jet pipe velocities are used, but the disadvantage arises that a very large-diameter jet pipe is necessary, which is difficult or even impossible to accommodate in a fighter.

The main object of the invention is to avoid this disadvantage in a very simple manner by the provision of a novel reheat device.

According to the invention, the reheat device comprises a fuel manifold to be supplied with fuel through an altitude-responsive control, and a flame stabiliser downstream of the manifold; means being provided for supplying a predetermined, additional, fixed rate of flow of fuel and oxygen to the interior of said stabiliser at and above a predetermined altitude (say, 40,000 feet), said fixed rate of flow being sufficient for operation of the reheat device at a predetermined maximum operating altitude (say, 100,000 feet) of the engine, said altitude-responsive control being operative to reduce to zero the flow of fuel to said fuel manifold at said predetermined maximum operating altitude.

Preferably, the flame stabiliser is an annular casing which is closed at its upstream end and has an open flared downstream end and is supported in the jet pipe by at least one radial strut of aerofoil cross-section, and said means includes separate radial supply pipes, or compartments, within at least one of said radial struts, by which fuel and oxygen (which can be pure gaseous oxygen, or originally liquid oxygen, or hydrogen peroxide) can be supplied to the interior of the casing at the upstream end thereof.

Also, preferably, the fuel manifold is axially spaced from the stabiliser sufficiently to ensure that the fuel, by intermixing with the exhaust gases, will be at least partly vaporised by the time it reaches the stable flame zone at the downstream end of the stabiliser.

In the accompanying drawings:

Figure 1 is a section through part of a jet pipe of a turbo-jet engine embodying the reheat device, the section being taken on line 1—1 of Figure 2;

Figure 2 is an end elevation of half of the jet-pipe;

Figure 3 is an enlarged section on line 3—3 of Figure 1; and

Figure 4:
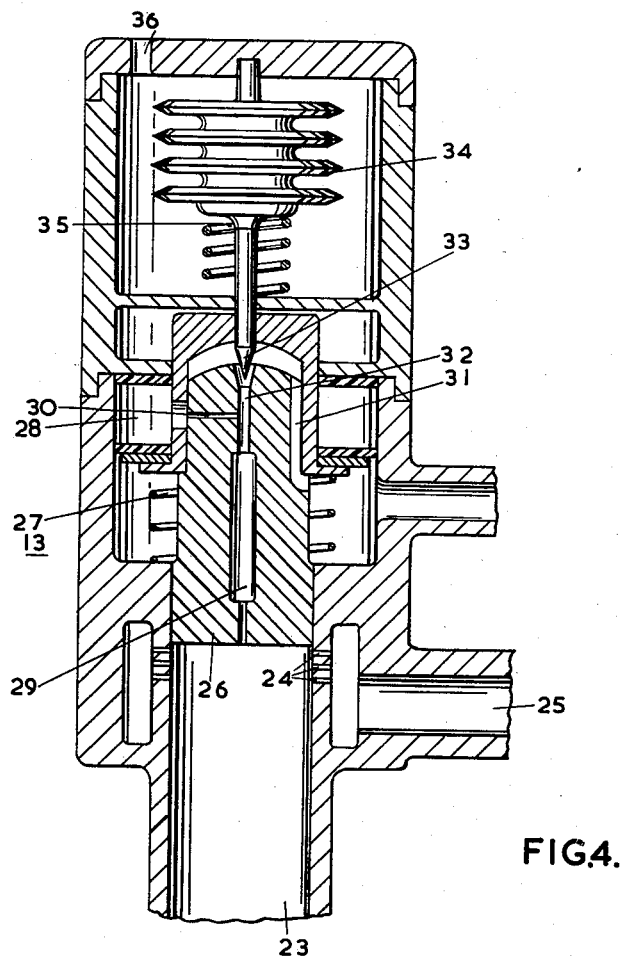
Figure 4 shows a section of the altitude responsive control shown as block 13 in Figure 1.

In Figures 1 and 2 is shown a jet pipe 10, the direction of the jet being indicated by the arrow 11. Within the jet pipe 10 is supported a fuel manifold 12 to which fuel can be supplied through an altitude-responsive control 13.

The downstream side of the manifold 12 is provided with a plurality of spaced apertures 14 through which the fuel enters the jet pipe 10.

Downstream of the fuel manifold 12 and axially spaced therefrom is an annular stabiliser casing 15 supported from the jet pipe 10 by six uniformly spaced radial struts 16 of aerofoil cross-section (Fig. 3). The stabiliser casing 15 is flared at its downstream, open, end 17; and fuel and oxygen are respectively supplied to the interior of the casing 15, at the closed upstream end thereof, through curved nozzles 18 and 19 respectively. The nozzles 18, 19 are fed with fuel and oxygen through respective radial supply compartments 20, 21 formed within the radial aerofoil struts 16.

The axial spacing of the fuel manifold 12 from the upstream end of the stabiliser casing 15 is such that the fuel from the manifold, by direct heating by intermixing with the exhaust gases, is at least partly vaporised by the time it reaches the stable flame zone at the downstream end of the stabiliser casing.

When the nozzles 18, 19 are brought into use they produce in the stabiliser casing a substantially-continuous annulus of the mixture of fuel and oxygen which, when ignited, will provide a stable and vigorous combustion flame of annular form sufficient, as it spreads downstream from the flared open end of the stabiliser casing, to ignite the mixture of partly vaporised fuel from the manifold 12 and unused oxygen in the exhaust gases passing down the jet pipe.

The altitude responsive control 13 is shown in more detail in Figure 4 in which the fuel from the pump outlet is delivered at the inlet 23 and passes through ports 24, when they are open, to an outlet 25 which leads to the fuel manifold 12 (Figure 1). The ports 24 are controlled by a slidable piston 26. The piston 26 is biased upwardly by spring 27 and downwardly by pressure of fuel in chamber 28. The fuel enters the chamber 28 through a coaxial channel 29 in the piston 26 and a radial channel 30. There is a leak passage 31 by which fuel can flow right through the piston, via the passage 32 at the upper end of the piston 26.

The passage 32 is closable by a needle valve 33 connected to a bellows 34, the bellows being biased to compressed condition by spring 35.

At the upper end of the altitude responsive control 13 is an inlet 36 for air derived from the air intake of the engine.

The control is shown in a position corresponding to a low altitude. As the altitude increases the air intake pressure decreases and the bellows 34 extend against the pressure of the spring 35 to close the needle valve 33 and, thereby, to close the passage 32. This effects the closing of the leak passage 31 and causes pressure to build up in the chamber 28 thereby moving the piston 26 downwardly to close one or more of the ports 24 and to reduce the supply of fuel through outlet 25 to the fuel manifold 12. The outward movement of the piston 26 causes the needle valve to be released from its seating in the passage 32 thereby re-opening the leak passage 31.

Obviously, this action is progressive, the piston 26 moving outwardly according to the decreasing pressure of the air supplied through inlet 36, so that the altitude responsive control functions to provide a decreasing amount of fuel with increasing height.

By effecting the primary combustion in an oxygen-rich environment with a minimum of inactive constituents present, in the manner described, there is a minimum delay in the combustion and a maximum release of heat energy as little or none of the heat released will have to be wasted in warming up inactive molecules.

The reheat device functions so that, as the operating altitude increases, the amount of assistance from the oxygen/fuel primary combustion for reheat purposes will increase until at the altitude limit—say, 100,000 feet—when it becomes very different for the rarified hot gases in the jet pipe to support combustion, the whole mass of gas is then heated directly by the primary flame up to the required temperature.

During the operation of the device the rate of delivery of fuel and oxygen to the annular stabiliser casing 15 is constant from the altitude at which it is first introduced (say 40,000 feet) to the ultimate altitude at which the engine is designed to operate (say, 100,000 feet), the rate being determined by the requirements at this ultimate altitude.

The main reheat fuel supply to the manifold 12 is controlled by the altitude-responsive control 13 to decrease progressively in accordance with increase in altitude until at the ultimate altitude (say, 100,000 feet) it will cease, when all the reheating will be effected by the fuel and oxygen supplied to the annular stabiliser casing 15.

Thus, at medium altitudes there is a large mass of gas in the jet pipe 10 which will take its part in combustion with only a little extra help from the oxygen-enriched primary zone, but at extreme altitudes the total mass of gas is very much reduced and can be heated by means of a small quantity of oxygen and fuel. It follows, therefore, that the total rate of oxygen consumption to achieve good "reheat" conditions is small and, in general, independent of altitude.

When liquid oxygen is used for reheat purposes in a fighter, a small quantity should be sufficient for a single fighter operation. In the case of a fighter using also a liquid oxygen rocket, the supply of such a relatively small quantity of liquid oxygen for reheat purposes would be almost unnoticeable. The extra thrust from the jet pipe at high altitudes would replace the rocket thrust and thus save an appreciable amount of oxygen for the same total thrust.

The invention has the further advantage that reignition of the afterburner could be effected without difficulty, substantially independently of the speed and altitude of the aircraft.

Obviously, the stabiliser and fuel supply manifold can be used as a reheat device up to 40,000 feet without supplying additional fuel and oxygen through the radial supply compartments. It is only at and above say 40,000 feet that the additional fuel and oxygen are supplied. Of course, the altitude-responsive device is continuously operative at all altitudes.

Whether the reheat is brought into use above or below 40,000 feet streak ignition can be used for initiating combustion.

What I claim as my invention and desire to secure by Letters Patent of the United States is:

1. A turbo-jet engine including a compressor, a turbine, a combustion chamber, a "reheat" afterburner attached to said engine in which additional fuel is burnt for added thrust, a fuel supply manifold supported in said afterburner, a flame stabiliser supported in said afterburner downstream of said fuel supply nozzle, and means for supplying additional fuel and oxygen to said flame stabiliser, said means being brought into operation at a predetermined altitude and supplying a constant rate of supply of fuel and oxidizer, said constant rate being sufficient for operation of the reheat afterburner at a predetermined maximum operating altitude, and means being provided for controlling the supply of fuel to said fuel supply nozzle in indirect proportion to altitude whereby the supply of fuel to said nozzle is reduced to zero at said predetermined maximum operating altitude.

2. A turbo-jet engine including a compressor, a turbine, a combustion chamber, a "reheat" afterburner attached to said engine in which additional fuel is burnt for added thrust, a fuel supply manifold supported in said afterburner, an annular flame stabiliser casing supported in said afterburner downstream of said fuel supply nozzle, said casing having an open flared downstream end and a closed upstream end, at least one radial strut of aerofoil cross-section supporting said casing, and said radial strut providing means including separate internal radial compartments for supplying additional fuel and oxygen respectively to the interior of said flame stabiliser at the upstream end thereof, said means being brought into operation at a predetermined altitude and supplying a constant rate of supply of fuel and oxidizer, said constant rate of supply being determined by the requirement of the engine at a predetermined maximum operating altitude, and means being provided for controlling the supply of fuel to said fuel supply nozzle in indirect proportion to altitude whereby the supply of fuel to said nozzle is reduced to zero at said predetermined maximum operating altitude.

3. A turbo-jet engine including a compressor, a turbine, a combustion chamber, a "reheat" afterburner attached to said engine in which additional fuel is burnt for added thrust, a fuel supply manifold supported in said afterburner, a flame stabiliser casing supported in said afterburner downstream of said fuel supply nozzle, said flame stabiliser having a closed upstream end and an open downstream end providing a stable flame zone at the downstream end of the stabiliser, and means for supplying additional fuel and oxygen to said flame stabiliser, said means being brought into operation at a predetermined altitude and supplying a constant rate of supply of fuel and oxidizer, said constant rate being determined by the requirement of the engine at a predetermined maximum operating altitude, and means being provided for controlling the supply of fuel to said fuel supply nozzle in indirect proportion to altitude whereby the supply of fuel to said nozzle is reduced to zero at said predetermined maximum operating altitude, said fuel manifold being axially spaced from the stabiliser casing sufficiently to ensure that the fuel, by intermixing with the exhaust gases, will be at least partly vaporised by the time it reaches the stable flame zone at the downstream end of the stabiliser.

4. In a turbo-jet engine, a compressor, a turbine, a combustion chamber, a "reheat" afterburner attached to said engine in which additional fuel is burnt for added thrust, a fuel supply manifold supported in said afterburner, a flame stabiliser casing supported in said afterburner and axially spaced downstream of said fuel supply nozzle, at least one radial strut, said strut supporting said stabiliser casing, and means including separate supply compartments in said radial strut for supplying additional fuel and oxygen to said flame stabiliser casing, said means being brought into operation at a predetermined altitude and supplying a constant rate of supply of fuel and oxidizer, said constant rate being determined by the requirement of the engine at a predetermined maximum operating altitude, and means being provided for controlling the supply of fuel to said fuel supply nozzle in indirect proportion to altitude whereby the supply of fuel to said nozzle is reduced to zero at said predetermined maximum operating altitude.

References Cited in the file of this patent

UNITED STATES PATENTS

| | | |
|---|---|---|
| 2,651,173 | Thwaites et al. | Sept. 8, 1953 |
| 2,689,452 | Jordan | Sept. 21, 1954 |
| 2,702,452 | Taylor | Feb. 22, 1955 |
| 2,715,813 | Holmes | Aug. 23, 1955 |